Patented Aug. 19, 1952

2,607,802

UNITED STATES PATENT OFFICE 2,607,802

BROMINATION OF AROMATIC COMPOUNDS

Edgar C. Britton and Russell M. Tree, Jr., Midland, Mich., assignors to The Dow Chemical Company, Midland, Mich., a corporation of Delaware No Drawing. Application March 28, 1951, Serial No. 218,068

16 Claims. (Cl. 260—544)

This invention relates to the bromination of aromatic compounds, and more particularly to such bromination using, as the brominating agent, a mixture of approximately equimolecular amounts of chlorine and bromine.

The present invention is based upon the discovery that bromination proceeds to the virtual exclusion of chlorination when chlorine and bromine, in an approximately equimolecular proportion, are reacted in an anhydrous system with certain aromatic organic compounds. Such bromination proceeds more readily, and at a lower temperature, than when bromine alone is used as a brominating agent.

The principal object of the invention is to provide an improved method for brominating certain aromatic organic compounds.

More specific objects and advantages are apparent from the description, which illustrates and discloses, but is not to be construed as limiting the invention.

According to the invention chlorine and bromine are used, in an anhydrous system, to brominate an aromatic organic compound. Bromine and chlorine are used in a molecular ratio of from 0.7:1 to 1.3:1, preferably from 0.9:1 to 1.1:1. The aromatic organic compounds that are brominated have a molecular structure consisting of a benzene ring having not more than three substituents attached thereto. The substituents, if any, consist of one or more groups selected from the following: (a) not more than two —NO₂ groups, (b) not more than two carbonyl halide radicals wherein the halogen is of atomic number from 17 through 35, i. e., is chlorine or bromine; (c) not more than two —OM groups wherein M is a hydrocarbon radical free of ethylenic and acetylenic unsaturations; (d) not more than two phenyls; and (e) not more than three halogen radicals of atomic number from 17 through 35 inclusive.

It is not understood by what mechanism chlorine and bromine react with an aromatic organic compound to brominate the latter. However, it has been discovered that bromination is substantially the only halogenation that occurs when bromine and chlorine, in a molecular ratio of from 0.7:1 to 1.3:1, are contacted, in an anhydrous system, with an aromatic organic compound and that substantially all the chlorine present is converted to HCl. If the ratio of bromine to chlorine is substantially higher than that indicated above, bromination proceeds in a relatively satisfactory manner, but HBr, which is considerably more valuable than HCl, is formed as a by-product. It is usually necessary, for economic reasons, to recover any substantial amount of HBr formed, while HCl can simply be scrubbed from the mixture of reaction products and discarded. If, on the other hand, a ratio of bromine to chlorine substantially lower than that indicated above is employed, chlorination proceeds to a substantial extent, so that the finished product is a mixture of chlorinated and brominated materials. Bromination of aromatic organic compounds, as herein defined, is not feasible in an aqueous system. Most desirably, bromine and chlorine are used in about a 1:1 molecular ratio.

The reaction of the invention proceeds readily when the aromatic organic compound is benzene or benzene substituted as hereinbefore set forth. The structure of the compounds readily brominated by the process of the invention may be more easily understood by reference to the following generic formula illustrative thereof:

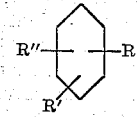

The substituents R, R', and R'' can be the same or different, and any one of them can be attached to any of the six positions on the benzene ring. As many as three of the substituents R, R', and R'' can be hydrogens or halogen radicals of atomic number from 17 through 35, inclusive; or a maximum of two of them can be phenyl, —NO₂, carbonyl halide radicals wherein the halogen is of atomic number from 17 through 35, inclusive, or —OM groups wherein M is a hydrocarbon radical free of ethylenic and acetylenic unsaturation. Although aromatic organic compounds outside the scope of the above definition can sometimes be brominated according to the method of the invention, the results achieved indicate that such brominations are not commercially feasible. If one or more of the substituents R, R', and R'' is —OM, it is usually preferred that M be an alkyl group of from one to four carbon atoms, or phenyl. The method of the invention is most useful to brominate —NO₂ substituted and acetyl halide substituted benzenes wherein the halogen is chlorine or bromine, particularly nitrozenzene, benzoyl chloride, and 2-chloro-4-nitrotoluene.

It is possible to carry out brominations according to the method of the invention without the use of any catalyst. However, it is ordinarily advantageous to employ one of the usual ring bromination catalysts, such as an amphoteric metal, a halide of an amphoteric metal, or iodine, or one of the usual alkane bromination catalysts, such as ultra violet light, an acetyl halide, a phosphorus halide, or sulfur, in the ordinary catalytic amounts, to speed reaction. Most desirably, the amount of catalyst employed is from 0.1 to 2 per cent of the compound being brominated. The terms "per cent" and "parts" are used herein, and in the appended claims, to mean per cent and parts by weight unless otherwise indicated. Ferric chloride is the most advantageous of the bromination catalysts.

Brominations of the invention are carried out in liquid phase, usually at a temperature between 0 and 200° C., preferably between 50 and 175° C., but the optimum temperature for any given bromination depends upon the ease with which the reaction proceeds. For example, nitrobenzene is readily brominated at a temperature between 60 and 80° C., while a temperature between 160 and 170° C. is advantageous for brominating 2-chloro-4-nitrotoluene. Similarly, any desired pressure can be employed in carrying out the bromination, but, since it proceeds readily at atmospheric pressure, this is usually the best technique.

It is ordinarily preferred to prepare a mixture comprising the aromatic organic compound to be brominated and a bromination catalyst, if one is employed, and to add bromine and chlorine to this mixture. The bromine and chlorine can be added as independent streams, or can be mixed prior to admission to the brominator, the latter procedure usually being better than the former. A particularly desirable technique is to prepare an organic solvent solution of bromine and chlorine in the desired proportions, and to bring this solution into contact with the aromatic organic compound to be brominated. In certain instances, it has been found that the material to be brominated is a good solvent for chlorine and bromine, e. g., nitrobenzene and benzoyl chloride; when this is true, the aromatic organic compound itself is an ideal organic solvent for such use. Otherwise, the organic solvent employed should be inert to both chlorine and bromine, and should be one that does not react with the aromatic organic compound to be brominated. Carbon tetrachloride is an excellent example of such a solvent.

It is usually practical to carry out brominations of the invention using from 50 to 100 per cent of the halogen, i. e., combined chlorine and bromine, theoretically required to effect the desired extent of bromination, although reaction proceeds with either more or less. Most desirably, from 70 to 90 per cent of the halogen theoretically required is used. Either mono- or dibromination is practiced by the method of the invention.

The rate at which chlorine and bromine are added to the aromatic organic compound to be brominated is controlled by two factors. First, it is advantageous to avoid either local or general overheating of the mixture. Second, it is advantageous to avoid the separation of substantial amounts of gaseous chlorine or bromine from the liquid composition in the reactor. Therefore, the rate of addition employed should be sufficiently slow to avoid such overheating in the equipment used, and to avoid $Cl_2$ or $Br_2$ separation from the liquid. It is usually feasible to use a faster chlorine-bromine addition rate when a preformed solvent solution thereof is employed because vapor phase separation of $Cl_2$ or $Br_2$ is less likely by this technique. In many instances it is practical to add the chlorine and bromine at from 0.1 to 0.5 mol per hour per mol of aromatic organic compound in the reactor.

Reaction proceeds at a relatively rapid rate according to the method of the invention. Usually, bromination is substantially complete by the time the chlorine and bromine have been added to the brominator. It is ordinarily desired, however, to maintain the reaction mixture at about the temperature used for the bromination for a period of time after completion of this addition; such a technique allows time for completion of reaction, and avoids excessive recycle problems. It is ordinarily satisfactory to allow from 30 to 60 minutes for such completion.

The following examples are presented further to illustrate the process of the invention, but are not to be construed as limitative:

EXAMPLE 1

Nitrobenzene was brominated by subjecting it to the action of approximately equimolecular portions of chlorine and bromine according to the following procedure:

A 100 gallon glass lined kettle equipped with a reflux condenser attached to a hydrogen halide scrubber filled with a 15 per cent sodium hydroxide solution was charged with a mixture of 616 pounds (5 pound mols), of nitrobenzene and 6.2 pounds of anhydrous ferric chloride. A solution of 160 pounds (2.25 pound mols) of chlorine and 360 pounds (2.25 pound mols) of bromine in 150 pounds of carbon tetrachloride was prepared at a temperature from 0 to $+5°$ C., maintained within that temperature range, and added slowly to the stirred mixture in the kettle, which was maintained at a temperature between 65 and 70° C. during this addition. The carbon tetrachloride solution of chlorine and bromine was added to the mixture in the kettle over a period of 60 hours at a rate sufficiently slow that both overheating thereof and evolution of chlorine and bromine therefrom were avoided. After the carbon tetrachloride solution had all been added, the mixture in the reaction kettle was maintained, with stirring, at a temperature between 65 and 70° C. for an additional three hours. The reaction mixture was then allowed to cool to about 45° C., and was stirred at such temperature for an additional two hours while a stream of air was bubbled therethrough to remove dissolved HCl or unreacted chlorine or bromine. The mixture was then washed with water, and next with a 5 per cent sodium bisulphite solution. The aqueous layer was separated, and a 15 gallon addition of water was made to the organic layer remaining in the reactor, and soda ash was added thereto to neutrality. Steam was then passed into the reactor until substantially all carbon tetrachloride in the reaction mixture had been distilled. The aqueous layer was then separated from the organic layer, and the organic layer was dried and separated into its component parts by fractional distillation at a total pressure of from 5 to 15 mm. Hg. This distillation yielded 162 pounds of nitrobenzene and 685 pounds of 1-bromo-3-nitrobenzene. This amounts to a 75.3 per cent recovery of all bromine charged as 1-bromo-3-nitrobenzene, or of 91.8 per cent of all nitrobenzene consumed as 1-bromo-3-nitrobenzene.

A procedure similar to that described in the preceding paragraph was used to brominate 369 grams of nitrobenzene containing 3.7 grams of anhydrous ferric chloride in a 1000 cc. glass flask, except that a solution of 75 grams of chlorine in 180 grams of liquid bromine produced by bubbling the former into the latter at a temperature between −10 and 0° C. was used as the brominating solution; this solution was added to the nitrobenzene and ferric chloride over a period of 260 minutes. The nitrobenzene was maintained at a temperature between 130 and 140° C. during the chlorine-bromine addition, and for two hours after that addition was complete. Distillation as described above yielded 137 grams of nitrobenzene and 294 grams of 1-bromo-3-nitrobenzene.

If, for purposes of comparison, but not in accordance with the invention, it is attempted to brominate nitrobenzene by the action of bromine alone, in the presence of ferric chloride, it is found that a reaction temperature of from 100 to 150° C. is required to achieve a yield of 1-bromo-3-nitrobenzene comparable to that achieved by the procedure of the first paragraph of the example.

EXAMPLE 2

A one liter round bottomed flask equipped with a reflux condenser attached to two hydrogen halide scrubbers was charged with a mixture of 140 grams (1.55 gram mols) of 2-chloro-4-nitrotoluene, 0.8 gram of sulphur, and 2.5 grams of acetyl chloride as catalysts. The mixture in the flask was then subjected to the action of ultraviolet rays from a commercial sun-lamp, and liquid bromine at a rate of 13.7 grams per hour (0.17 gram mol per hour) and gaseous chlorine at a rate of 6 grams per hour (0.17 gram mol per hour) were admitted to the flask below the surface of the liquid. The mixture in the flask was maintained at a temperature between 160 and 170° C. during the addition of chlorine and bromine. This addition was continued for 13 hours until a total of 175 grams (2.1 gram mols) of bromine and 78 grams (2.1 gram mols) of chlorine had been added to the flask. The reaction mixture was held at a temperature between 160 and 170° C. for an additional 70 minutes, with stirring, and was then freed of acetyl chloride and unchanged halogens by heating under vacuum. It was determined by titration that about 1.3 mols of hydrogen chloride had been absorbed in the scrubber. The reaction mixture was subjected to fractional distillation as described in Example 1. A cut of 163 grams of crude alpha,alpha-dibromo-2-chloro-4-nitrotoluene boiling over a temperature range of 138 to 142° C. at 1.0 mm. Hg was recovered; this crude product was purified by recrystallization from absolute ethyl alcohol to give the dibromo compound in relatively pure form, with a melting point of 68.0 to 69.0° C.

EXAMPLE 3

Procedures similar to that described in the first paragraph of Example 1 were employed to brominate benzoyl chloride, anisole, toluene, and 4-nitrobiphenyl. The materials used, and the exact conditions, for each of these brominations are set forth in Tables I and II below. Table I shows the preparation of the organic solvent solution of Cl₂ and Br₂, and Table II the reaction of this solution with the aromatic organic compound.

Table I

| Run Identification | Cl₂ | | Br₂ | | Solvent for Bromine and Chlorine | | |
|---|---|---|---|---|---|---|---|
| | Gms. | Gm. Mols | Gms. | Gm. Mols | Name | Gms. | Gm. Mols |
| 1 | 106 | 1.5 | 240 | 1.5 | Benzoyl Chloride | 141 | 1 |
| 2 | 114 | 1.6 | 256 | 1.6 | CCl₄ | 174 | |
| 3 | 114 | 1.6 | 256 | 1.6 | CCl₄ | 174 | |
| 4 | 114 | 1.6 | 256 | 1.6 | CCl₄ | 174 | |
| 5 | 6 | 0.085 | 14 | 0.087 | CCl₄ | 79 | |

Table II

| Run Identification | Starting Material | | | Catalysts Used | | Temp. of Br₂:Cl₂ Solution °C. | Reaction Temp. °C. | Time in Hrs. for Addition of Br₂:Cl₂ Solution | Reaction Times in Min. after Br₂:Cl₂ Addition | Product Recovered | Gms. |
|---|---|---|---|---|---|---|---|---|---|---|---|
| | Name | Gms. | Gm. Mols | Name | Gms. | | | | | | |
| 1 | Benzoyl Chloride | 281 | 2 | Anhydrous FeCl₃ | 5 | −10-0 | 80 to 85 | 6 | 60 | m-Bromobenzoyl Chloride¹ | 465 |
| 2 | Anisole | 432 | 4 | I₂ | 0.2 | −10-0 | −1 to +5 | 3½ | 90 | p-Bromoanisole | 455 |
| 3 | Toluene | 369 | 4 | Anhydrous FeCl₃ | 1.9 | −10-0 | 0 to +5 | 6 | 30 | o-Bromotoluene and p-Bromotoluene | 178 / 221 |
| 4 | do | 369 | 4 | I₂ | 0.2 | −10-0 | 0 to +5 | 2 | 120 | o-Bromotoluene / m-Bromotoluene / p-Bromotoluene | 83.2 / 5.9 / 208.9 |
| 5 | 4-Nitrobiphenyl | 33 | 0.165 | Anhydrous FeCl₃ | 0.3 | −10-0 | 74 to 79 | 1 | 30 | 4-Bromo-4′-Nitrobiphenyl | 17.1 |

¹ It was found that no replacement of the carbonyl chlorine by bromine had occurred.

We claim:

1. A bromination method that comprises contacting bromine and chlorine, in a molecular ratio of from 0.7:1 to 1.3:1, with an aromatic organic compound whose molecular structure consists of a benzene ring having attached thereto not more than three radicals, as follows: (a) not more than two —NO₂ groups; (b) not more than two carbonyl halide radicals wherein the halogen is of atomic number from 17 through 35, inclusive; (c) not more than two —OM groups wherein M is a hydrocarbon radical free of ethylenic and acetylenic unsaturations; (d) not more than two phenyls; and (e) not more than three halogen atoms of atomic number from 17 through 35 inclusive.

2. A bromination method that comprises contacting, in liquid phase, bromine and chlorine, in a molecular ratio of from 0.9:1 to 1.1:1, with an aromatic organic compound whose molecular structure consists of a benzene ring having attached thereto not more than three radicals, as follows: (a) not more than two —NO₂ groups; (b) not more than two carbonyl halide radicals wherein the halogen is of atomic number from 17 through 35, inclusive; (c) not more than two —OM groups wherein M is a hydrocarbon radical free of ethylenic and acetylenic unsaturations; (d) not more than two phenyls; and (e) not more than three halogen atoms of atomic number from 17 through 35 inclusive.

3. A method as claimed in claim 2 in which the bromination is carried out in the presence of a bromination catalyst selected from the group consisting of amphoteric metals, amphoteric metal halides, and iodine.

4. A method as claimed in claim 3 in which the amount of catalyst used comprises from 0.1 to 2 per cent of the compound being brominated.

5. A method as claimed in claim 4 in which bromine and chlorine are used in about a 1:1 molecular ratio.

6. A method as claimed in claim 2 in which the bromine and chlorine are mixed in the desired proportions, and the mixture is contacted with the aromatic organic compound.

7. A bromination method that comprises contacting an organic solvent solution of bromine and chlorine, in a molecular ratio of from 0.9:1 to 1.1:1, and in the presence of a catalyst selected from the group consisting of amphoteric metals, amphoteric metal halides, and iodine, with a liquid phase aromatic organic compound whose molecular structure consists of a benzene ring having attached thereto not more than three radicals, as follows: (a) not more than two —NO₂ groups; (b) not more than two carbonyl halide radicals wherein the halogen is of atomic number from 17 through 35, inclusive; (c) not more than two —OM groups wherein M is a hydrocarbon radical free of ethylenic and acetylenic unsaturations; (d) not more than two phenyls; and (e) not more than three halogen radicals of atomic number from 17 through 35 inclusive.

8. A method as claimed in claim 7 in which the amount of catalyst used comprises from 0.1 to 2 per cent of the compound being brominated.

9. A method as claimed in claim 8 in which bromine and chlorine are used in about a 1:1 molecular ratio.

10. A method as claimed in claim 7 in which the catalyst is an amphoteric metal halide.

11. A method as claimed in claim 10 in which the metal halide catalyst comprises from 0.1 to 2 per cent of the compound being brominated.

12. A method as claimed in claim 7 in which the organic solvent solution of bromine and chlorine is a carbon tetrachloride solution.

13. A method as claimed in claim 12 in which the carbon tetrachloride solution of bromine and chlorine is formed, and this solution is contacted with the aromatic organic compound.

14. A bromination method that comprises preparing a nitrobenzene solution of equimolecular quantities of bromine and chlorine and contacting the said solution with nitrobenzene in the presence of from 0.1 to 2 per cent of ferric chloride, based upon total nitrobenzene, at a temperature between 60 and 80° C.

15. A bromination method that comprises preparing a benzoyl chloride solution of equimolecular quantities of bromine and chlorine, and contacting the said solution with benzoyl chloride, in the presence of from 0.1 to 2 per cent of ferric chloride, based upon total benzoyl chloride, at a temperature between 70 and 90° C.

16. A bromination method that comprises subjecting 2-chloro-4-nitrotoluene to the action of equimolecular proportions of chlorine and bromine at a temperature between 160 and 170° C.

EDGAR C. BRITTON.
RUSSELL M. TREE, JR.

No references cited.